April 30, 1968   J. L. LILJEQUIST   3,380,317
ENGINE CONTROLS
Filed April 26, 1965
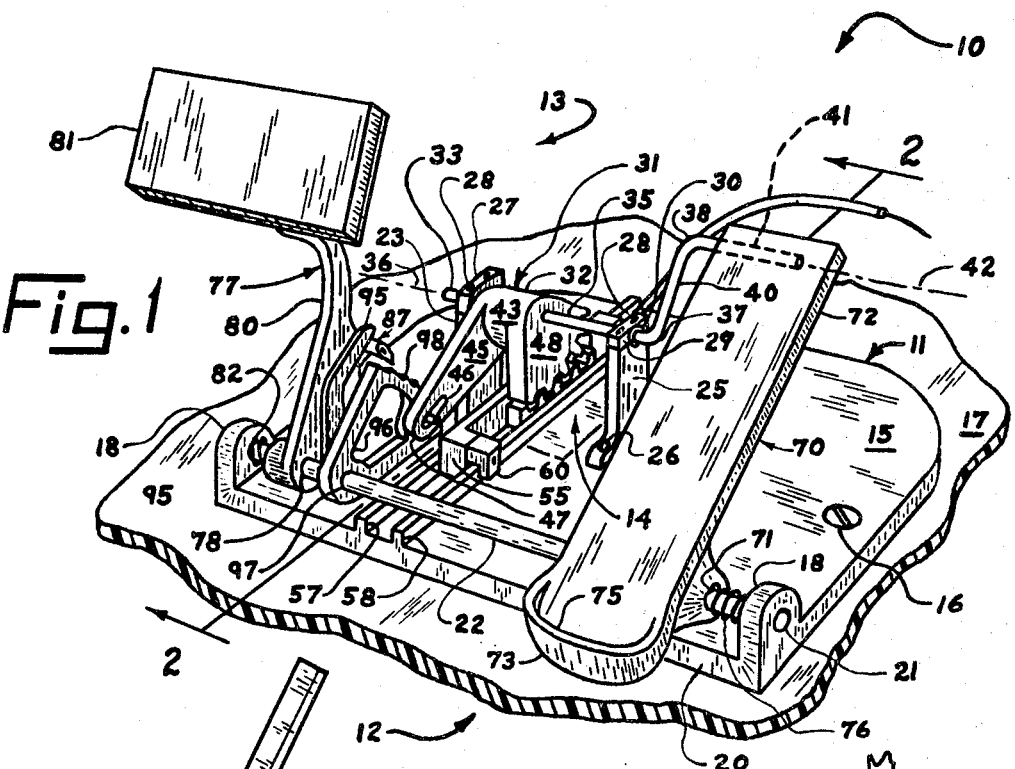
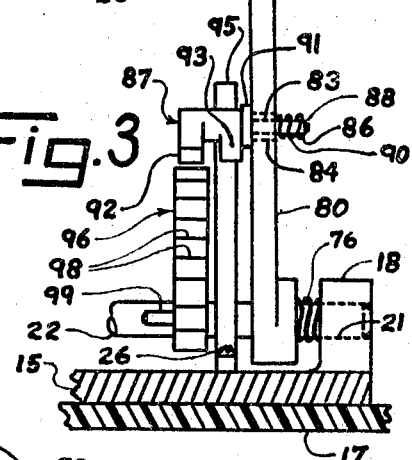
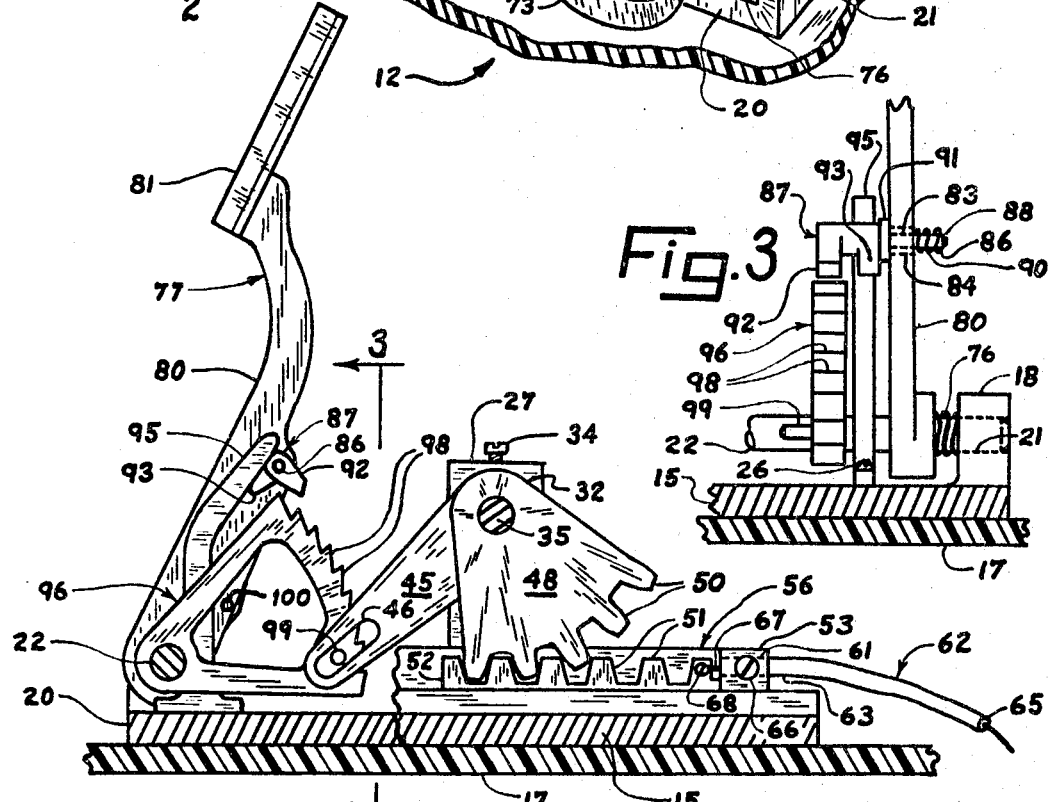
INVENTOR
Don L. Liljequist

United States Patent Office 3,380,317
Patented Apr. 30, 1968

3,380,317
ENGINE CONTROLS
Jon L. Liljequist, Arlington Heights, Ill.
(801 S. Elmhurst Ave., Mount Prospect, Ill. 60056)
Filed Apr. 26, 1965, Ser. No. 450,665
14 Claims. (Cl. 74—479)

ABSTRACT OF THE DISCLOSURE

Engine controls for controllably varying the increase and decrease of engine output and characterized in its preferred embodiment by an accelerator pedal and a decelerator pedal resembling an automotive accelerator and brake. The controls also include lost motion built into the movement of the accelerator to prevent an accidental and unwanted increase in engine output and/or structure by which the decelerator is disconnected from the throttle during its non-use but is arranged to be reconnected preferably immediately upon depression thereof by the operator.

---

This invention relates to engine controls, and more particularly to engine controls for vehicles wherein the principal way of reducing vehicle speed is by reducing engine output.

Unlike the speed controls for automobiles, engine controls for certain other vehicles such as those for marine use are usually hand operated. Inasmuch as boats in general have no brakes with which to decelerate, boat operators must rely entirely upon a reduction of engine output to effect a reduction in vehicle speed, this usually being accomplished by easing off on the hand throttle.

Because of this difference between the operation of land and water vehicles, persons who operate a boat for the first time must learn to manipulate controls appearing to them quite foreign, and the prior ability to drive an automobile is of little assistance. Considerable practice is required with these hand controls before a novice is sufficently proficient to safely traverse rough or populated waterways. Small high speed boats are apt to be tossed about by waves, particularly at high speeds, and under these conditions, experienced boat operators keep one hand firmly grasped on the throttle preparation for reducing speed in case an emergency arises. This, unfortunately, leaves only one hand to steer a possibly violently bouncing craft. Under the influence of this bouncing, the boat operator may unintentionally jar the controls between accelerating and decelerating positions, and this further adds to the boat's erratic movements.

Because most persons are already skilled in the operation of an automobile before learning how to operate a boat, it is a general object of this invention to provide new and improved engine controls for the above described types of vehicles, which in their preferred form, closely resemble an automobile accelerator and brake in both form and operational effect.

It is another general object, and advantage, to provide new and improved engine controls which permit the operator to remain in continuous contact therewith, but are so arranged as to prevent variations in engine output due to bouncing of the vehicle.

A feature of the invention is the provision of separate accelerator and decelerator pedals, and means by which the decelerator pedal is disconnected from other portions of the controls upon release thereof to permit independent and relatively free movement of the accelerator pedal.

An extension of the previous feature is the provision of biasing means for returning the decelerator pedal to a raised position upon release thereof in a manner similar to the operation of an automobile brake pedal. A related feature is the provision of means by which depression of the decelerator pedal causes immediately responsive deceleration of the engine without initial lost motion, regardless of the prior setting of the accelerator.

Other objects, advantages, and features will become readily apparent from the following detailed description taken in conjunction with the accompanying drawings, in which:

FIG. 1 is a perspective view of the invention showing the top, the rear, and one side thereof;

FIG. 2 is a cross sectional view of the invention taken substantially along the lines 2—2 of FIG. 1; and FIG. 3 is a fragmentary cross sectional view of portions of the decelerating mechanism taken substantially along the lines 3—3 of FIG. 2.

While the invention is susceptible of embodiment in many different forms, there is shown in the drawings and will herein be described in detail a specific embodiment with the understanding that the present disclosure is to be considered as an exemplification of the principles of the invention and is not to be considered nor is it intended to limit the invention to the embodiment illustrated. The scope of the invention will be pointed out in the appended claims.

Referring now to the drawings, there is shown an engine control apparatus generally at 10 including a lower supporting structure 11 (which may be a separate structure, or alternatively, be an integral part of the vehicle), accelerating means as at 12, decelerating means as at 13, and means as at 14 adapted to be connected with the engine (not shown) for controllably varying the output thereof.

Support or supporting structure 11 includes a generally flat and horizontal base plate 15 having means as at 16 for securing it to a portion 17 of the vehicle. Leveling means (not shown) may be attached to or included in supporting structure 15 to facilitate its leveling when portions 17 of the vehicle are not level.

A pair of laterally spaced ears 18 extend upwardly from the rear portions 20 of plate 15, and are transversely bored as at 21 to receive a horizontal and laterally extending shaft 22 which supports portions of the accelerating and decelerating means, to be described more fully later.

Also extending upwardly from base plate 15 at a position forward of ears 18 are a pair of laterally spaced bearing supports 23 and 25 secured at their bottom portions to base 15 by fasteners 26, and carrying, respectively, bearing caps 27 and 29 at their upper ends which are secured thereto as by fasteners 28. Each bearing support and bearing cap is semi-circularly grooved so that when the bearing cap is mounted on the bearing support the two in combination form a cylindrical hole therethrough for receiving a suitable low friction bearing or bushing 30.

Means are provided for controlling the output of the engine, and herein take the form of a control member 31 having a main body portion 32, and shaft portions 33 and 35 rigidly affixed thereto and extending laterally outwardly therefrom toward each side of the control apparatus 10, said shaft portions being pivotally mounted within bearings 30 about pivotal axis 36. Rotation of control member 31 relative to bearing support 23 may be retarded or dampened in variable amounts by means of a set screw 34 extending into and through bearing cap 27, it being understood that the bottom of the screw may be driven into the bearing to cause deformation thereof.

Shaft portion 35 continues laterally beyond support 25 and is bent first at 37 and then at 38 to form a driven arm 40 or connection means by which control member 31 may be pivoted upon proper movement of the accelerator means 12, to be described later. End portions 41 of driven arm 40 extend laterally along an axis 42 parallel to and spaced forwardly of axis 36.

Body portion 32 of control means 31 consists of a cylindrical mass 43 coincident with axis 36 and having second connection means or a controlled arm 45 extending generally rearwardly therefrom and having a slot 46 therethrough at its end portions 47, said slot being elongated in a direction perpendicular to axis 36 of shaft 33. As will be described later, decelerator means 13 are in contact with controlled arm 45 permitting pivotal movement of control member 31 in a sense opposite that which accelerator means 12 can impart thereto.

Extending generally downwardly from cylindrical mass 43 is another connection means or driving arm 48 in the form of a sector of a circle having gear teeth 50 at the end thereof, said arm being adapted to be connected operably with the engine by means to be described next.

Gear teeth 50 mesh with the teeth 51 of an elongate rack 52 which permits arm 48 to drive the rack horizontally forwardly and rearwardly. Forward and rearward movement of the rack is restricted by means of front and rear stop portions 53 and 55 respectively of a rack cradle member 56, this cradle member being aligned laterally and adjustably positional in a forward and rearward direction by means of a pair of horizontal and spaced apart guides 57 and 58 formed integrally with base plate 15. After being positioned in the proper front to rear location, the cradle member is locked to guide 58 by clamping means 60.

Front stop portion 53 of cradle member 56 has a bore 61 therethrough aligned with the rack for receiving means by which engine control apparatus 10 and the engine are linked together, or more specifically, control apparatus 10 and the output control means of the engine. Herein these means take the form of a conventional Bowden type of cable 62 having one end of its outer casing 65 fixably secured within bore 61 as by set screw 66. Within outer casing 65 and extending rearwardly beyond the end 63 of cable 62 is the corresponding end of inner moveable wire 67 which is fixably secured to the forward end of rack 52 as by set screw 68. The engine end (not shown) of cable 62 is conventionally connected to the output control means on the engine, e.g., the throttle where the currently most popular engine control means are used. It will be understood that with this type of connection, pivotal movement of control member 31 will cause translation of rack 52 and result in control of the engine output.

Control member 31 is pivotally moveable between a first position corresponding to low engine output, and a second position corresponding to high engine output, this pivotal movement being limited in each direction by the limits of rectilinear movement of rack 52. Movement of rectilinear movement of rack 52. Movement of the control member towards the position of high engine output is accomplished by accelerator means 12, shown here in the form of a foot operated lever or pedal 70. Pedal 70, which may be referred to as an accelerator, is pivotally mounted as at 71 on shaft 22 of the supporting structure 15, and includes a forward portion 72 disposed in front of and above shaft 22, and a rear portion 73 disposed to the rear of shaft 22. The extreme rear portions of the accelerator form a ridge or lip 75 which serves as a guide and support for the heel portion of the operator's foot.

When the operator depresses or pushes forward portions 72 of the accelerator down, it contacts arm 40 of the control member and similarly pushes it down, thereby pivoting control member 31 and increasing the engine output. Because pedal 70 and driven arm 40 are not positively linked together, this pedal can only cause pivotal movement thereof in one direction toward a position of higher engine output. Therefore, retraction of this pedal so as to raise portions 72 has no effect on the previously set angular position of control member 31, and the engine output or vehicle speed (when the vehicle is "in gear") remains constant. This is not unlike the action experienced in an automobile having free wheeling when the driver takes his foot off the accelerator. Movement upward or retraction of pedal portions 72 is facilitated by a torsion spring 76, which tends to give the accelerator pedal the same feel as automotive accelerators, and also by the placement of the pivotal mounting 71 ahead of the operator's heel such that he can positively retract the pedal by applying a downward force with his heel. Furthermore, in rough water the operator can depress the pedal to attain the desired speed, and can then retract the pedal and keep the weight of his leg on his heel, thereby preventing power fluctuations when traversing a rough course.

Return movement of control member 31 to a lower value of engine output or to its first position (corresponding to low engine output) is accomplished by decelerator means 13. Herein these means include a decelerator lever or pedal 77 in the form of an automotive brake pedal pivotally mounted to shaft 22 of the supporting structure as at 78. Decelerator pedal 77 comprises an arm 80 extending generally upwardly and carrying at its upper end a padded plate 81 for engagement by the operator's foot.

Pedal 77 is pivotally movable between a raised position, as shown in solid lines in FIG. 2, and a lower forwardly depressed position, not shown. Means in the form of a torsion spring 82 is attached to lower portions of arm 80 and biases the pedal upwardly toward its raised position with sufficient torque to require a force to push it down of a magnitude comparable to that required to push down a relatively stiff automotive brake pedal.

Between shaft 22 and plate 81, arm 80 has a transversely oriented bore 83 therethrough (best seen in FIG. 3) carrying a low friction bearing or bushing 84 which pivotally receives the pin portion 86 of pawl or engaging means 87. Pin 86 extends through arm 80 as at 88 and is angularly biased relative thereto in a sense opposite that of the biasing of decelerator pedal 77 by a combination torsion and compression spring 90, the compression in the spring serving to hold the pawl device against shoulder 91 of the bushing 84. Pawl device 87 also includes a pawl 92 and an integrally formed arm 93, said arm acting as one part of a combination stop and disengagement means for limiting the upward pivotal movement of the decelerator as well as disengaging the decelerator pedal from the control member, to be described in greater detail later. The other part of the stop means is in the form of a long stationary arm 95 fixably attached at its bottom to plate 15 and extending upwardly alongside pedal arm 80 to a position of interfering relationship with the upward and rearward movement of arm 93 of pawl device 87. Pawl device 87 is biased in a clockwise direction, as viewed in FIG. 2, under the influence of spring 90, but is prevented from rotating clockwise when pedal 77 is in its uppermost position due to the relatively stiff spring 82 which drives and holds arm 93 against stationary arm 95, as best shown in FIG. 2. When the decelerator pedal is depressed, arm 93 moves away from stationary arm 95, and the spring 90 is able to rotate pawl device 87 clockwise (as viewed in FIG. 2) relative to pedal 77.

In the preferred embodiment shown, the decelerator pedal 77 is disconnected from control member 31 when the pedal is in its uppermost position. This configuration permits the control member to be pivoted by the accelerator pedal without being influenced by the inertia or bias of the decelerator pedal.

Means are provided for positively connecting the decelerator pedal and the control member for pivoting the latter to its first position corresponding to low engine output, said means including the pawl portion 92 of the pawl device and engageable ratchet means 96 pivotally mounted to shaft 22 of the supporting structure as at 97 and having generally the shape of a sector of a circle. Arranged along the outer arcuate periphery of the ratchet are a plurality of ratchet teeth 98 in the same general plane of movement as pawl 92 (best seen in FIG. 3), and adjacent to its path of movement as the decelerator pedal is pivoted. Into the lower forward portions of ratchet 96 is mounted a pin 99 which extends laterally outwardly and through the slot 46 of driven arm 45 of control member 31, thereby linking the ratchet and control member together in a constrained manner.

In operation, and assuming both the engine is running and in gear, continuous depression of the accelerator pedal 70 first causes contact thereof with driven arm 40, and further depression causes pivotal movement of control member 31. Gear sector 48 of the control member drives the rack 52 rearwardly toward rear stop 55, and dependent cable wire 67 controllably increases the engine output control means on the engine. Vehicle speed is thus brought up to the desired magnitude and steadily maintained by backing off on the accelerator pedal. If the vehicle is operating over a rough course, any bouncing of the operator's leg (which with continuously connected foot controls would cause erradic engine response) can be taken up by shaft 22 due to the placement of the pivot 71 relative to the rear edge 75 of the decelerator pedal.

When it is desired to decelerate, the operator depresses the decelerator 77, this pedal appearing and having the feel of an automotive brake. In the first short increment of decelerator movement, the pawl device 31 moves away from stationary arm 95 permitting spring 90 to pivot the pawl device whereupon pawl 92 is driven into the ratchet tooth nearest thereto. Further pivotal movement of decelerator pedal 77 pivots ratchet 96 an equal angular displacement thus driving rack 52 forward toward front stop 53 and thereby diminishing the engine output and vehicle speed. It will be observed that regardless of the position of control member 31, which determines engine speed, the decelerator or brake pedal can always be found at its uppermost position similar to an automotive brake pedal. Furthermore, the decelerator pedal immediately begins decelerating the vehicle upon depression thereof with no lost motion, thereby adding to the safety of the controls.

The control apparatus 10 can easily be used in a wheeled vehicle equipped with a conventional independent brake system. In this application the decelerator pedal 77 is connected to the master cylinder of the brake system by means of a linkage (not shown) which is pinned to pedal arm 80 by means of a hole 100 provided therefor. The "play" or lost motion in the linkage leading to the brake master cylinder is designed or adjusted so that pressure is not applied to the brake drums or discs until decelerator pedal 77 is depressed sufficiently to diminish engine output to a desirable low level. It will be understood that this application permits the decelerator pedal to perform both of the functions of positively reducing engine output and, in combination with the independent brake system, positively braking the vehicle.

While my invention has been principally described with respect to certain specified applications, it is to be understood that I contemplate its use in any form of vehicle utilizing a reduction in engine output to vary the vehicle speed or power. The invention is not to be construed as limited in scope to the embodiment shown, but rather by the scope of the appended claims.

I claim:

1. Apparatus for controlling the output control means of an engine, comprising: o support; lost motion accelerating means disengageably connectable with said output control means for selectively increasing engine output to a higher level upon advancement and for constantly maintaining said higher level upon retraction; means moveably mounting said accelerating means to said support for movement between a position corresponding to low engine output and a position corresponding to high engine output; decelerating means movable independently of the accelerating means and arranged for positively and controllably decreasing engine output to any desirable lower level; and means moveably mounting said decelerating means on said support for movement between a position corresponding to high engine output and a position corresponding to low engine output.

2. Apparatus for controlling the output control means of an engine, comprising: a support; a control member adapted to be operably connected to the output control means for controlling the operation thereof; means passively mounting said control member on said support for movement between a first position corresponding to low engine output and a second position corresponding to high engine output; accelerator means movably mounted on said support for movement between a retracted position and an advanced position; and operably engageable with said control member during advancement for positively advancing same toward its second position; and decelerator means movably mounted on said support independently of said accelerator means for controllably moving said control member towards its first position.

3. The apparatus as defined in claim 2, including means for biasing said accelerator means towards its retracted position.

4. The apparatus as defined in claim 2, wherein said decelerator means includes a decelerator lever movable between an inactive position and a fully decelerating position, means biasing said lever toward its inactive position, and means for operably connecting said decelerator lever and said control member when said decelerator lever is moved toward its fully decelerated position, and for disconnecting said decelerator lever and said control member upon movement of said lever toward its inactive position.

5. The apparatus as defined in claim 2, wherein said decelerator means includes means for connecting said decelerator means with a brake system.

6. Apparatus for controllably varying the output control means of an engine, comprising: a supporting structure; a control member for controlling said output control means, the control member being movably mounted in an unbiased manner to the supporting structure for controlled movement to any fixed location between a first position corresponding to low engine output and a second position corresponding to high engine output, said control member having a plurality of connection means thereon, one of said connection means being adapted to be operably connected to the output control means of the engine; means in the form of an accelerator pedal movably mounted on said supporting structure and movable between a depressed position and a retracted position for operable engagement when depressed with another of said connection means to thereby pivot the control member to its high engine output position and for disengaging with said another connection means upon movement towards its retracted position to maintin a steady engine output; a decelerator pedal movably mounted on said supporting structure and spaced from said accelerator pedal, said decelerator pedal being movable between a first raised position and a second lower depressed position; and means connecting said decelerator pedal with said control member for causing smooth return movement of said control member to any lesser value of engine out responsive to the manner in which the decelerator pedal is depressed.

7. Apparatus for controllably varying the output control means of an engine, comprising: a supporting structure; a control member for controlling said output control means, the control member being movably mounted to the supporting structure for movement between a first position corresponding to low engine output and a second position corresponding to high engine output, said control member being adapted to be operably connected to the output control means; on accelerator pedal movably mounted on said supporting structure and movable between a depressed position and a retracted position, said accelerator pedal when depressed being operably engageable with said control member to thereby move said control member toward its high engine output position; a decelerator pedal movably mounted on said supporting structure, said decelerator pedal spaced from said accelerator pedal and movable between a first generally raised position and a second lower depressed position, means engaging said decelerator pedal for biasing the decelerator pedal towards its raised position, and angularly biased engaging means movably mounted to the decelerator pedal for movement between a disengagement position and an engagement position; engageable means connected to said control member and engageable by said engaging means for selectively connecting said decelerator pedal with said control member so that depression of said decelerator pedal pivots said control member toward its low engine output position; and disengagement means for moving said engaging means from its engagement position to its disengagement position upon retraction of said decelerator pedal.

8. Apparatus for controllably varying the output control means of an engine, comprising: a supporting structure; control means for controlling said output control means; an accelerator pedal mounted to said supporting structure and movable between a depressed position and a retracted position, said accelerator pedal being operably connectable with said control means; a decelerator pedal mounted to said supporting structure and movable between a raised position and a lower depressed position, means engaging said decelerator pedal for biasing the decelerator pedal towards its raised position, a pawl mounted to the decelerator pedal for movement relative thereto between a disengagement position and an engagement position and means for biasing said pawl from its disengagement position to its engagement position; means selectively connecting said decelerator pedal with said control means and including a ratchet movably mounted to the supporting structure, said ratchet having a plurality of teeth adjacent the path of movement of said pawl to permit said pawl to selectively engage one of said teeth upon depression of said decelerator pedal thereby permitting said ratchet to be pivoted, and means connecting said ratchet with the control means so that depression of said decelerator pedal pivots said control means towards its low engine output position; and pawl disengagement means for disengaging said pawl from said ratchet upon retraction of said decelerator pedal to its raised position.

9. The apparatus as defined in claim 8, wherein said decelerator pedal includes means for linking said decelerator pedal to a separate brake system.

10. Apparatus for controllably varying the output control means of an engine, comprising: a supporting structure; a control member for controlling said output control means, the control member being pivotally mounted to the supporting structure for movement between a first position corresponding to low engine output and a second position corresponding to high engine output, said control member having first and second connection means and a driving arm extending therefrom, said driving arm being adapted to be operably connected to the output control means; an accelerator pedal pivotally mounted to said supporting structure and movable between a depressed position and a retracted position, said accelerator pedal being operably engageable with said first connection means when depressed to thereby pivot said control member to its high engine output position; a decelerator pedal pivotally mounted to said supporting structure to one side of the accelerator pedal and having a foot engageable portion spaced from said pivotal mounting and being movable between a first raised position generally above said decelerator pedal axis and a second lower depressed position, means connected to said decelerator pedal for biasing the decelerator pedal towards its raised position, a pawl pivotally mounted to the decelerator pedal about an axis spaced from said decelerator pedal mounting, and means for biasing said pawl from its disengagement position to its engagement position; means selectively connecting said decelerator pedal with said control member and including a ratchet pivotally mounted to the supporting structure, said ratchet having a plurality of teeth arranged in an arcuate path around said ratchet axis adjacent the path of movement of said pawl to permit said pawl to selectively engage one of said teeth upon depression of said decelerator pedal thereby permitting said ratchet to be rotated, and means connecting said ratchet with the second connection means for causing pivotal movement of said control member toward its low engine output position upon depression of said decelerator pedal; and pawl disengagement means for disengaging said pawl from said ratchet upon retraction of said decelerator pedal to its raised position.

11. Apparatus for use by an operator to controllably vary the setting of an engine throttle, comprising: a supporting structure; a control member for controlling said throttle setting, the control member being pivotally mounted to the supporting structure about a generally horizontal axis thereby permitting pivotal movement between a first position corresponding to low throttle setting and a second position corresponding to high throttle setting, said control member including a main body portion having a driven arm and a controlled arm extending therefrom in opposing directions from said horizontal axis, and a driving arm extending therefrom, said driven arm being adapted to be linked to the engine throttle; an accelerator pedal pivotally mounted to said supporting structure about a generally horizontal axis and having a forward portion extending above and forward of said pivotal mounting and having a rearward portion extending behind said pivotal mounting to thereby permit the operator to pivot said accelerator pedal between a depressed position of said forward portion and a retracted position thereof, said accelerator pedal being operably engageable with said driven arm when said forward portion is depressed to thereby pivot said control member toward its position corresponding to high throttle setting; a decelerator pedal in the form of a brake pedal pivotally mounted to said supporting structure about a generally horizontal axis, said decelerator pedal disposed to one side of the accelerator pedal and having a foot engageable portion spaced from said decelerator axis, said foot engageable portion being pivotally movable between a raised position generally above said decelerator pedal axis and a lower depressed position, means connected to said decelerator pedal for biasing the decelerator pedal towards its raised position, a pawl device pivotally mounted to the decelerator pedal about an axis parallel to and spaced from said decelerator pedal axis for relative pivotal movement between an engagement position and a disengagement position, said pawl device including a pawl and a deactivating arm, and means for angularly biasing said pawl device towards its engagement position; means positively linking said control member with said decelerator pedal during depression thereof and including a ratchet pivotally mounted to the supporting structure about substantially the same axis as said deceleraotr pedal axis and in generally the same plane of movement as said pawl, said ratchet having a plurality of teeth arranged in an arcuate path around said ratchet axis facing outward toward the path of movement of said pawl to permit said pawl to engage one of said teeth upon depression of the decelerator pedal thereby permitting said ratchet to be rotated thereby, and means connecting said ratchet with said controlled arm of said control member so that depression of said decelerator pedal pivots said control member toward its position corresponding to low throttle setting; and pawl disengagement means mounted to said supporting structure and having portions placed interferingly in the path of motion of said deactivating arm for disengaging said pawl from said ratchet teeth upon retraction of said decelerator pedal to its raised position by camming said deactivating arm against said pawl disengagement means to thereby permit manipulation of said accelerator pedal without such manipulation affecting the position of the decelerator pedal.

12. Apparatus for controlling the output control means of an engine, comprising: a support; a control member adapted to be operably connected to the output control means for controlling the operation thereof; means for mounting said control member on said support for movement between a first position corresponding to low engine output and a second position corresponding to high engine output; accelerator means movably mounted on said support for movement between a retracted position and advanced position; means for disengageably connecting said control means and said accelerator means for causing movement of said control means toward its second position upon movement of said accelerator means toward its advanced position; and decelerator means movably mounted on said support independently of said accelerator means for moving said control member toward its first position, said decelerator means including a decelerator lever movable between an inactive position and a fully decelerating position, means biasing said lever towards its inactive position, and means for operably connecting said decelerator lever and said control member when said decelerator lever is moved toward its fully decelerated position and for disconnecting said decelerator lever and said control member upon movement of said lever toward its inactive position.

13. In a foot-controlled device having a depressable accelerator pedal for advancing the output control means of an engine to a position of higher output, said device also having a separate decelerator pedal movable between retracted and depressed positions for controllably effecting a reduction in engine output to any desirable lower level, means for isolating the decelerator pedal from the accelerator pedal and output control means during advancement thereof to permit their relatively free movement, comprising: engaging means for forming a positive connection between the decelerator pedal and the output control means during depression of said decelerator pedal, and means connected to said decelerator pedal for biasing same towards its retracted position and for effecting a disconnection of said decelerator pedal from said output control means upon movement of the pedal toward its retracted position.

14. In an engine output controlling device adapted for connection with the output control means of an engine and having an accelerator lever for increasing engine output, said device also havig a separate decelerator lever movable generally between retracted and depressed positions for controllably effecting a reduction in engine output to any desirable lower level, the improvement comprising: a control member engageable by said accelerator lever movably mounted on said device and operably connected to the output control means, biasing means connected to said decelerator lever for biasing said decelerator lever to its retracted position, engaging means on said decelerator lever arranged for substantially immediately effecting advancement of said control member upon movement of said decelerator lever toward its depressed position and for becoming isolated from said control member upon movement of the decelerator lever toward its retracted position, and stop means for maintaining isolation of said engaging means from the control member when said decelerator lever is in its retracted position.

References Cited
UNITED STATES PATENTS

| | | | |
|---|---|---|---|
| 1,395,651 | 11/1921 | Mills | 74—513 |
| 1,569,612 | 1/1926 | Burrows | 74—513 |
| 2,827,800 | 3/1958 | Brelsford | 74—513 |

FOREIGN PATENTS

| | | |
|---|---|---|
| 972,317 | 8/1950 | France. |

MILTON KAUFMAN, *Primary Examiner.*